(12) United States Patent
Shaw

(10) Patent No.: US 7,347,019 B1
(45) Date of Patent: Mar. 25, 2008

(54) DEVICES INCORPORATING A BI-STABLE RIBBON SPRING

(76) Inventor: Edward Emil Shaw, 2395 S. Ash La., Flagstaff, AZ (US) 86004

( * ) Notice: Subject to any disclaimer, the term of this patent is extended or adjusted under 35 U.S.C. 154(b) by 465 days.

(21) Appl. No.: 10/962,786

(22) Filed: Oct. 12, 2004

(51) Int. Cl.
G09F 15/00 (2006.01)

(52) U.S. Cl. .................. 40/607.01; 40/607.03

(58) Field of Classification Search ........... 40/607.1, 40/607.01, 610, 611.01, 607.03
See application file for complete search history.

(56) References Cited

U.S. PATENT DOCUMENTS

| | | | |
|---|---|---|---|
| 4,157,626 A | 6/1979 | Bedinghaus | |
| 4,825,921 A * | 5/1989 | Rigter | 160/23.1 |
| 4,862,614 A | 9/1989 | Shettleroe | |
| 4,989,396 A | 2/1991 | Weder et al. | |
| 5,068,988 A | 12/1991 | Mason | |
| 5,154,389 A | 10/1992 | Hodgin | |
| 5,168,647 A | 12/1992 | Castro | |
| 5,176,452 A * | 1/1993 | Stern | 383/43 |
| 5,275,282 A | 1/1994 | Ross et al. | |
| 5,373,942 A | 12/1994 | Weder et al. | |
| 5,392,549 A | 2/1995 | Castro | |
| D362,022 S | 9/1995 | Larson | |
| 5,647,156 A | 7/1997 | Hull et al. | |
| 5,738,398 A * | 4/1998 | Miano | 294/1.1 |
| 5,845,804 A | 12/1998 | Prescott | |
| 5,924,869 A | 7/1999 | Haas | |
| 5,971,612 A | 10/1999 | McAuslan | |
| 6,170,182 B1 | 1/2001 | Skypala | |
| 6,309,076 B1 * | 10/2001 | McVicker | 359/601 |
| 6,425,494 B1 | 7/2002 | Woods, II | |
| 6,609,318 B2 | 8/2003 | Augustine et al. | |
| 6,829,863 B2 | 12/2004 | Lovas | |

\* cited by examiner

*Primary Examiner*—Christopher P. Ellis
*Assistant Examiner*—Brian Swenson
(74) *Attorney, Agent, or Firm*—John R Daugherty

(57) ABSTRACT

A bi-stable snap action ribbon spring incorporated into self-latching, spring-loaded mechanisms. The dual mode stability of the spring eliminates the need for complex latching mechanisms thereby simplifying the device manufacture and device reliability. The spring is stable in either a linear or coiled state enabling the simplified design of rolling, hinging and feeding mechanisms. A plan or map rolling and presentation device incorporates a bi-stable snap action ribbon spring along with optional spring end caps and stiffening elements. The plan or map is driven to a stable coiled or stable rolled shape by the influence of the snap action spring. Application of the snap spring properties to a discreet length of a longer ribbon can create a hybrid bi-stable hinge mechanism. A convenient storage container utilizes the bi-stable characteristics of a snap action ribbon spring to create a container having a self-closing and captured lid. A can or drum feeder incorporates the bi-stable characteristics of a snap action ribbon spring to provide a device that reliably stores and presents cans such as soda cans.

27 Claims, 14 Drawing Sheets

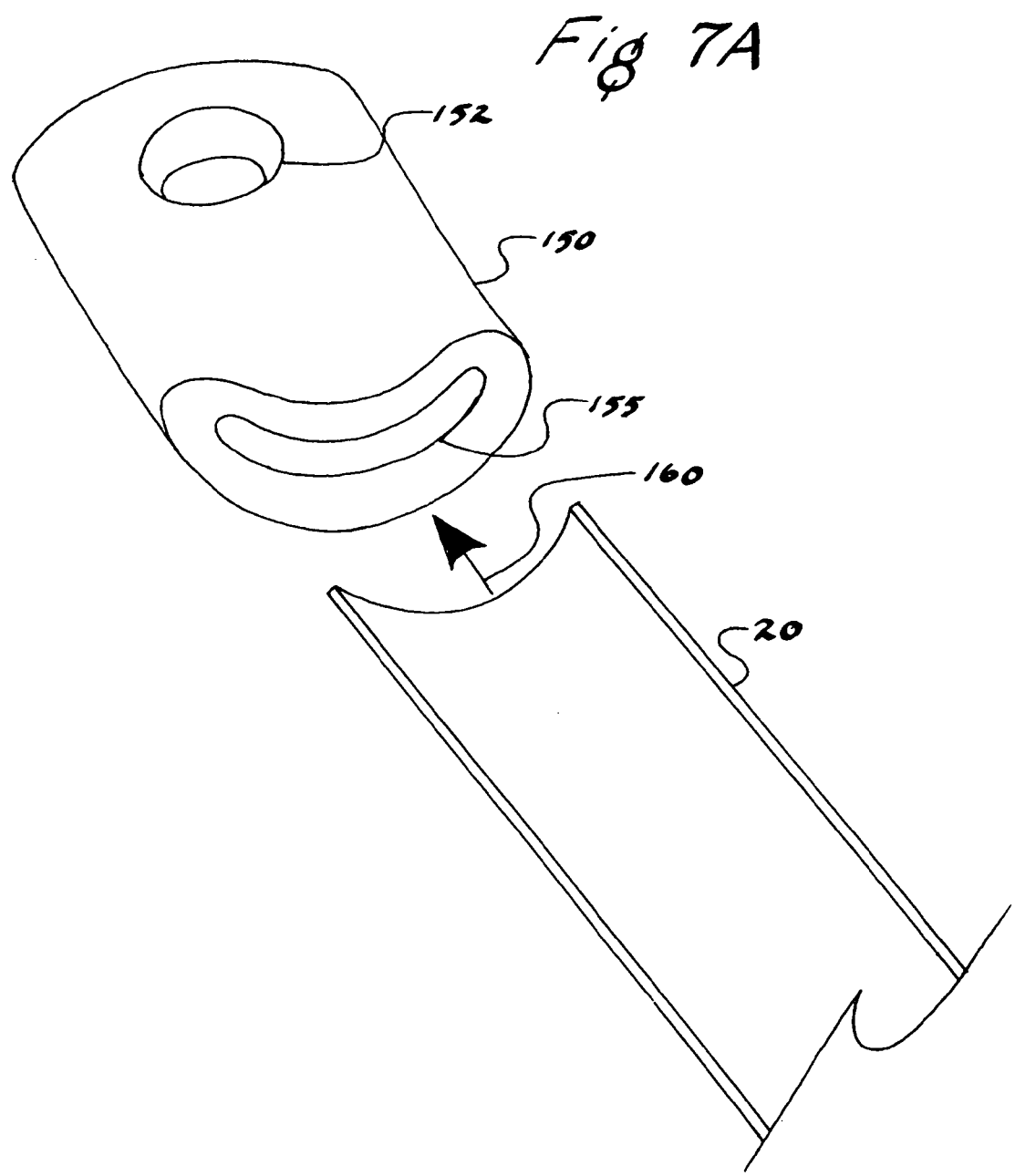

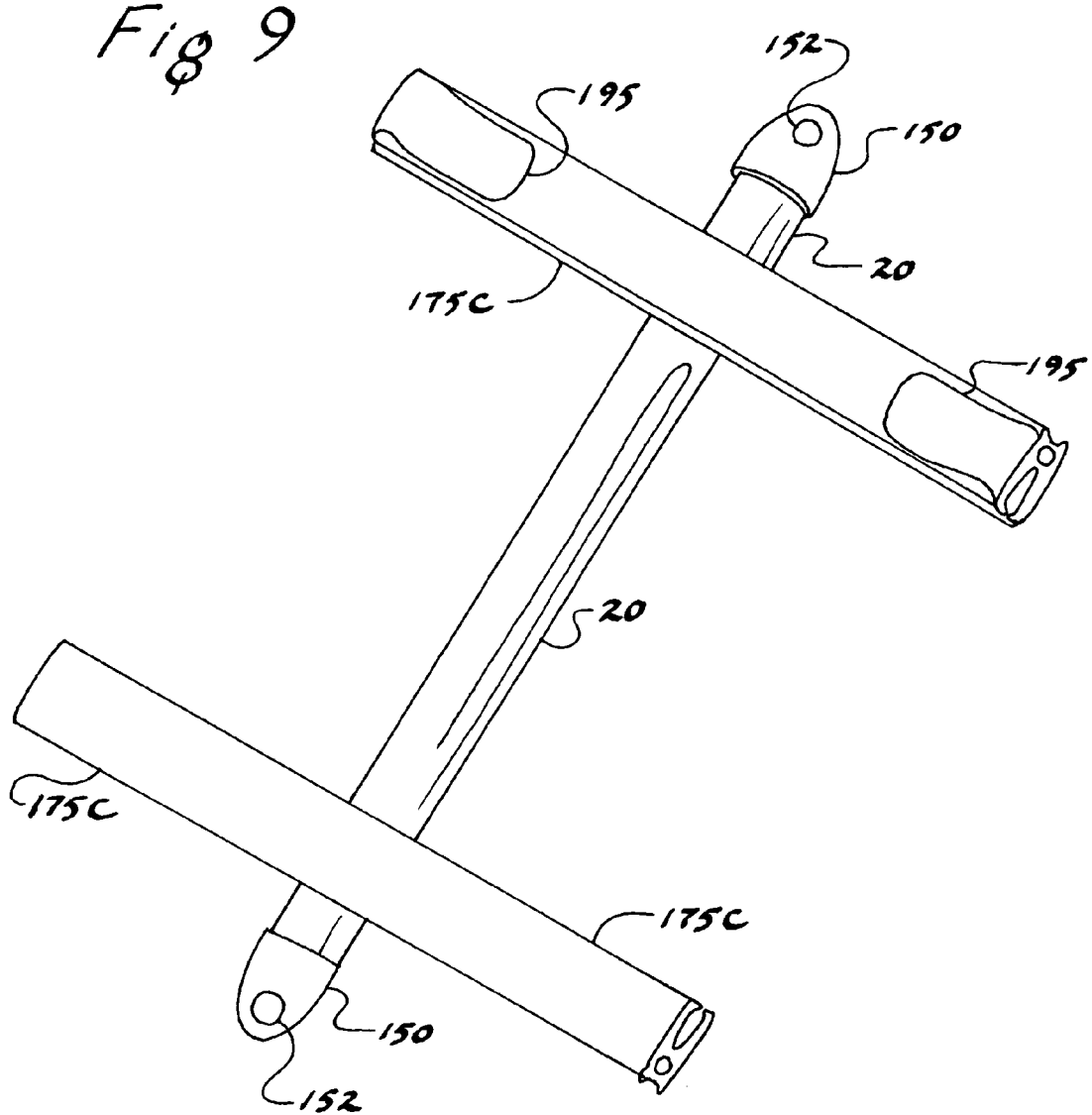

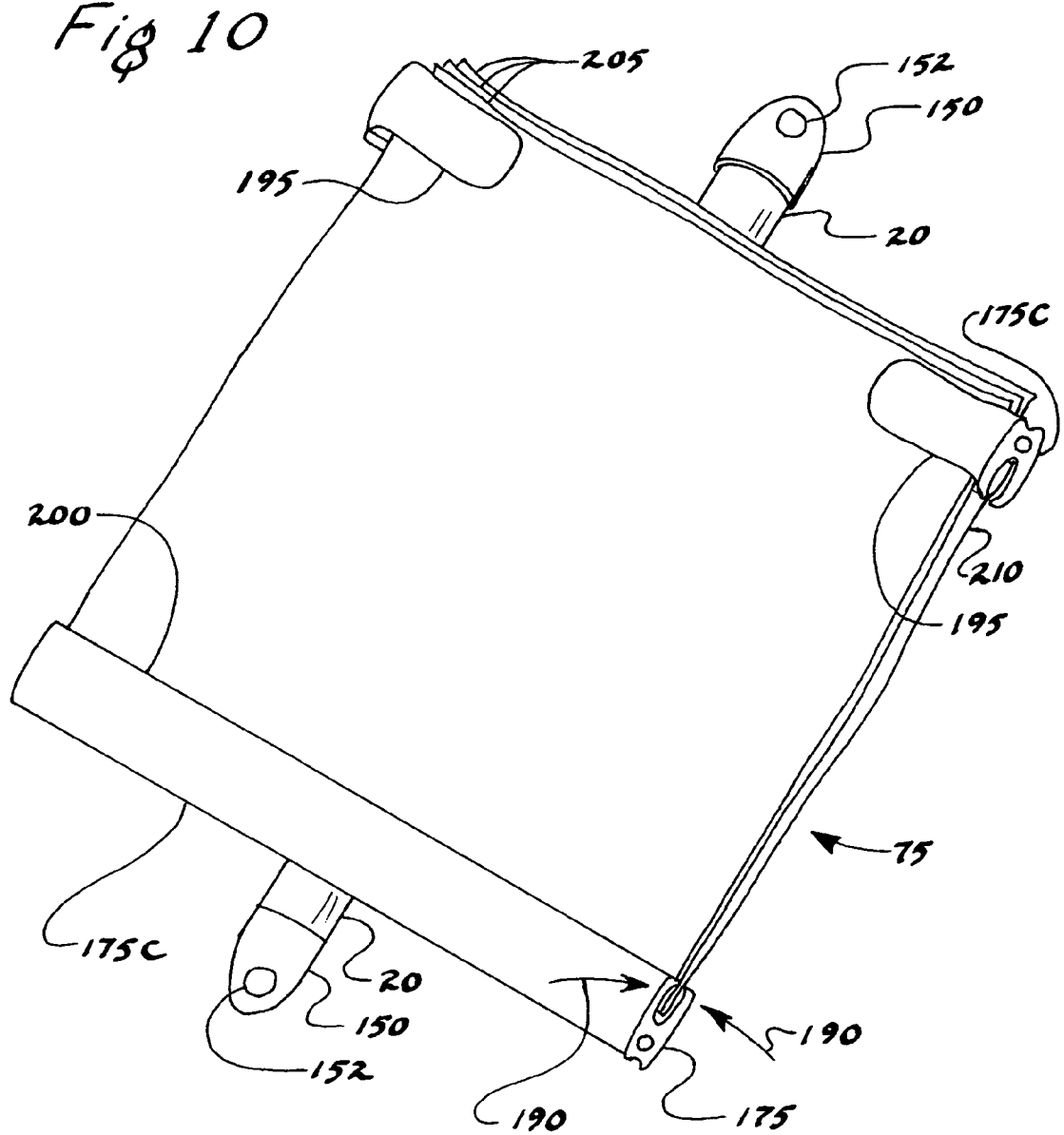

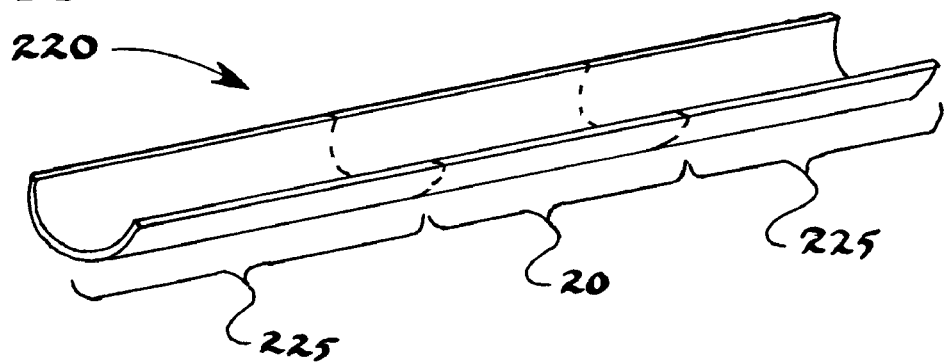
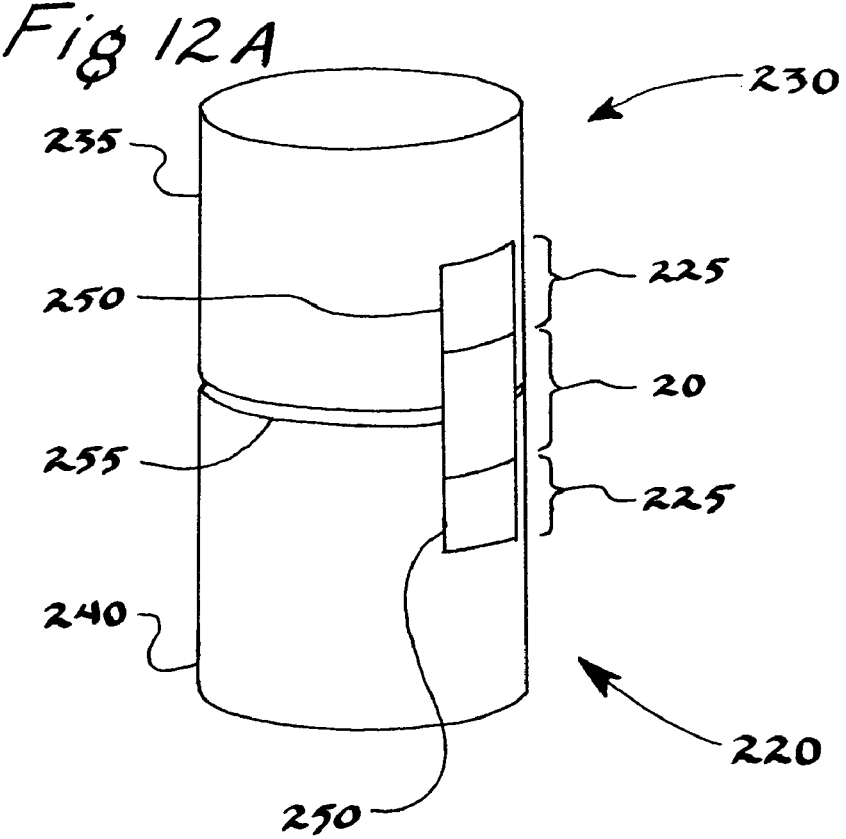

DEVICES INCORPORATING A BI-STABLE RIBBON SPRING

FIELD OF THE INVENTION

The present invention relates to devices that incorporate a bi-stable ribbon spring and in particular rolled article storage devices, hinging devices and can or drum feed devices utilizing a bi-stable ribbon spring.

BACKGROUND OF THE INVENTION

In the world of mechanical devices there are many examples of mechanical action driven by a spring force. Examples of such mechanical systems include map or plan rollers, window or opening covers, hinged containers and can or drum feeding mechanisms.

In some of these applications it is desirable to provide a latching mechanism to maintain the spring in its pre-loaded state until such a time, as the force of action is required. Traditionally, the latching mechanism has been in the form of a secondary mechanical device such as a pawl, latch or catch. These additional mechanisms add complexity and cost to spring loaded systems and may ultimately affect the reliability of the system.

A bi-stable ribbon spring has unique characteristics in that the spring has a first stable linear state and a second stable coiled state. Such springs have been incorporated into "slap bracelets" which are short (approximately 6" to 9" long) bi-stable springs contained within a cloth sack. When flexed the slap bracelet self coils around a user wrist assuming a first stable coiled state. The bracelet can be removed and straightened to assume a second stable linear state. Such bi-stable snap springs have also been labeled and used as tape measures that can assume a first stable linear state and a second stable coiled state.

In the area of plan or map holders there is a need for a convenient, simple mechanism that will maintain the stability of plan or map in either a rolled cylindrical state or in an un-rolled planer state. While in the stable rolled cylindrical state, the map or plan can be effectively transported or stored. While in the stable un-rolled planer state the map or plan can be displayed without the need for a supporting surface such as a table or other flat surface. A particular need exists for a simple display device that resists the natural curling of the plan or map which results from being stowed in the rolled state.

Similarly, there is a need for a simple bi-stable hinging mechanism that could be used in various conditions and for various purposes. Such hinges would have a "self locking" feature and two stable positions without the need for additional mechanisms. Such a hinge applied to a simple container would insure full closure of the container. The container would also have a captured lid that cannot be misplaced.

In addition there is a need for a simple can or drum feeding mechanism that would allow effective storage and presentation of cans in confined spaces such as refrigerators, packaging containers, coolers or storage shelves.

SUMMARY OF THE INVENTION

The present invention utilizes the bi-stable characteristics of a snap action ribbon spring to create a self-latching, spring-loaded mechanism that greatly simplifies the design of many devices. The dual mode stability of the spring eliminates the need for complex latching mechanisms thereby simplifying the device manufacture and device reliability. The spring is stable in either a linear or coiled state that enables the simplified design of rolling, hinging and feeding mechanisms.

A map rolling and presentation device of the present invention incorporates a bi-stable snap action ribbon spring along with optional spring end caps and stiffening elements. This device of the present invention, when attached to a plan or map forces the plan or map into a convenient stable coiled or rolled shape, allowing effective transportation or storage. The user can then un-coil the ribbon spring along with attached plan or map and "snap" the spring to induce a second stable linear or planer shape. While in this planer shape, the plan or map can be reviewed without the aid of a secondary surface or devices to prevent spontaneous roll-up of the plan or map. The user can return the map or plan to the rolled state by inducing a "snap" to the spring which results in the spring retraction of the plan to the coiled state. Devices of the present invention, similar in construction to a map or plan roller, can be used as a bi-stable window cover, a surface covering or as a display device for signs or posters.

Application of the snap spring properties to a discreet length of a longer ribbon can create a bi-stable hinge mechanism. A convenient storage container of the present invention utilizes the bi-stable characteristics of a snap action ribbon spring to create a container having a self-closing and captured lid. Such containers of the present invention can be used in a variety of environments and for numerous purposes such as the storage of medications, chemicals, liquids and articles.

A simple can or drum feeder of the present invention incorporates the bi-stable characteristics of a snap action ribbon spring to provide a device that reliably stores and presents cans such as soda cans. Can feeders of the present invention occupy minimal space, have a simple construction and are ideally suited for the presentation of cans in confined spaces such as refrigerators, packaging containers, coolers or storage shelves.

BRIEF DESCRIPTION OF DRAWINGS

Shown in FIG. 1A is an isometric view of a bi-stable "snap-spring" in a stable coiled state as used in various embodiments of the present invention.

Figure 3A:
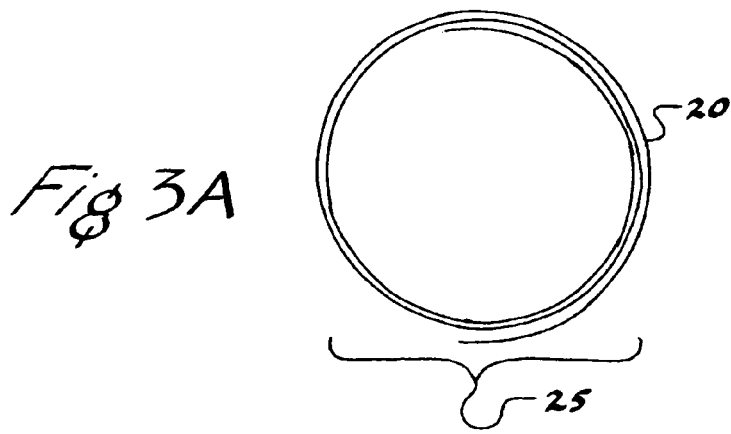
FIG. 3A depicts a side plan view of a bi-stable spring while in a stable coiled state.
Figure 3B:
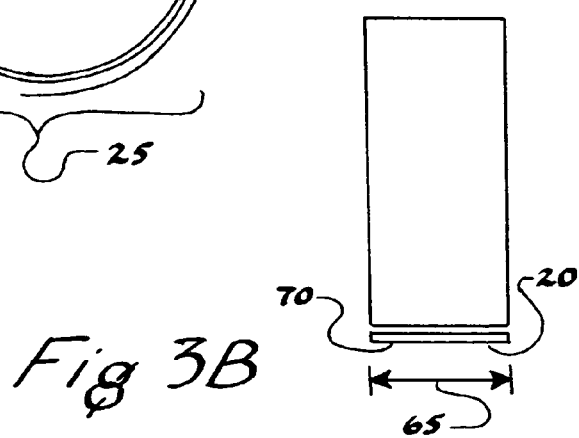

Shown in FIG. 3B is an end view of the spring displaying a spring width while in a stable coiled state.

Figure 4A:
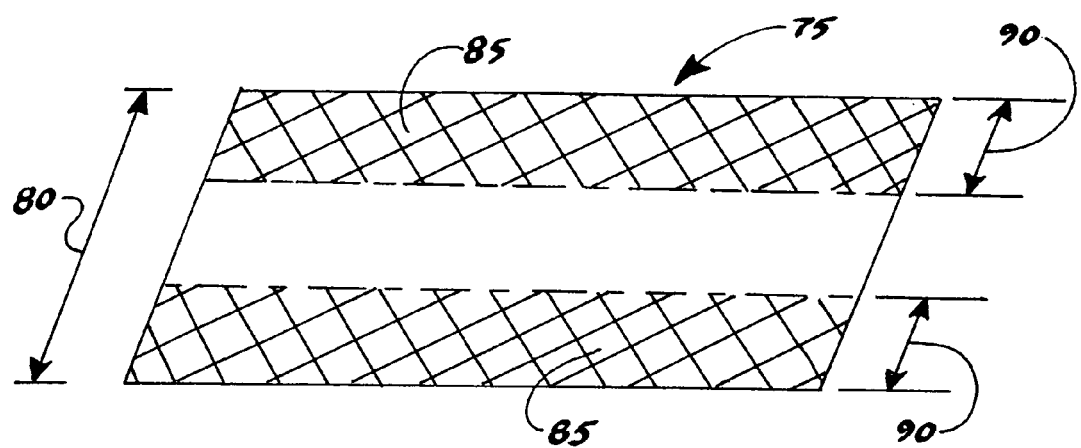

FIG. 4A is an isometric view of a generic flexible or rollable article such as a drawing, map, or surface covering having two opposed perimeter regions.

Figure 4B:
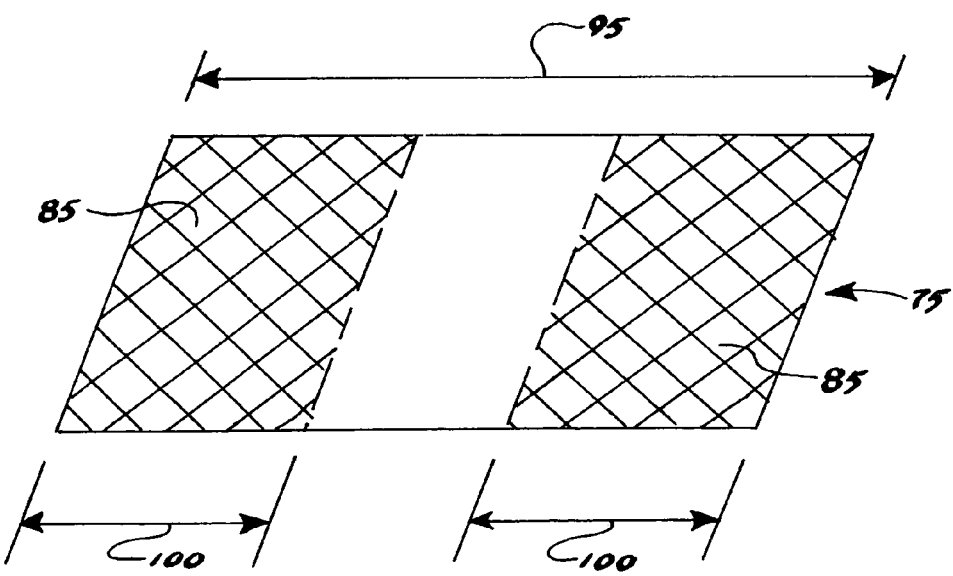

Shown in FIG. 4B is an isometric view of a generic flexible or rollable article having a width and two opposing perimeter regions.

Figure 5A:
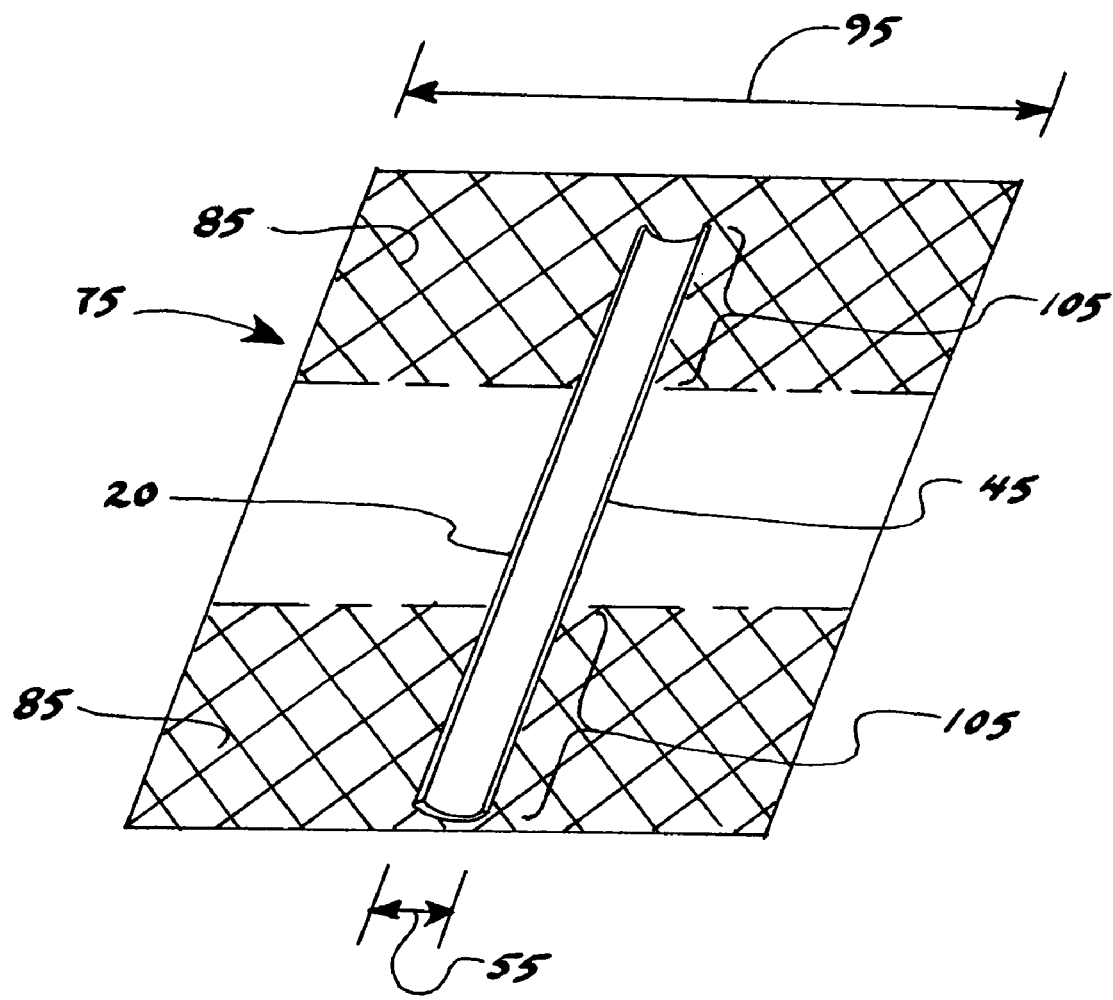

Shown in FIG. 5A is an isometric view of a preferred embodiment of a flexible article storage and display device according to the present invention.

Figure 5B:
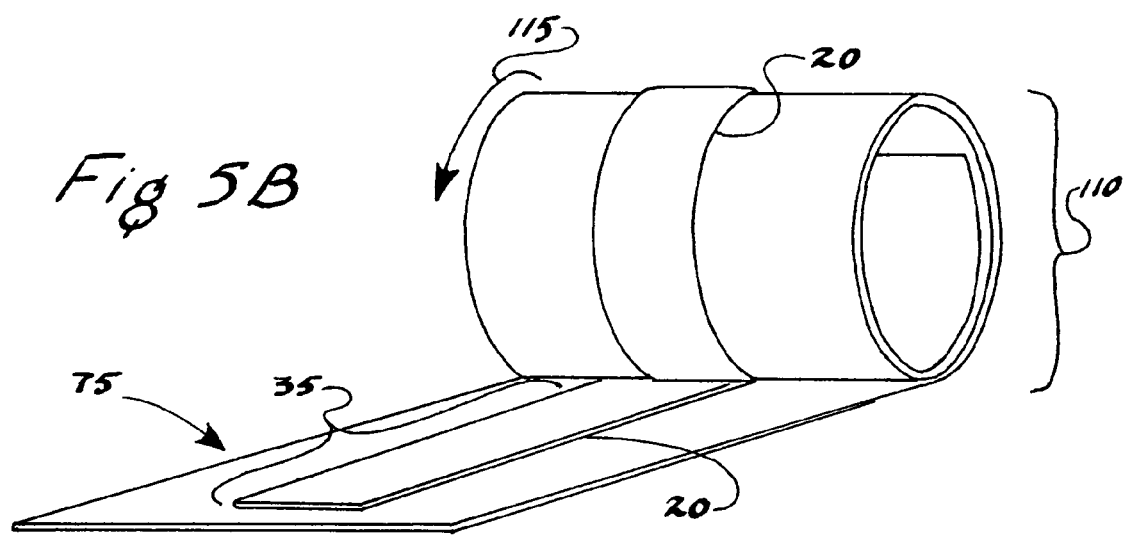

Shown in FIG. 5B is an isometric view of the article storage device of FIG. 5A in a partially coiled state.

Figure 5C:
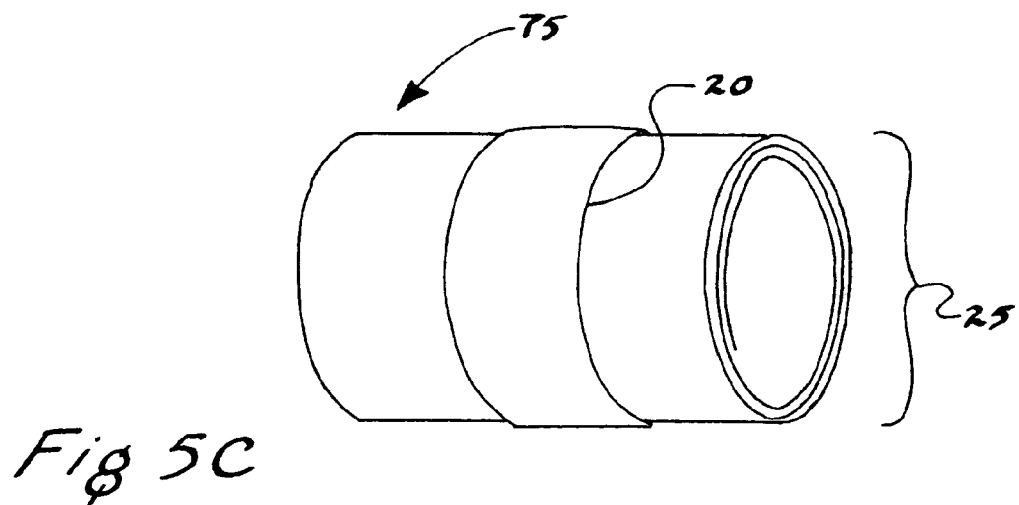

Shown in FIG. 5C is an isometric view of a flexible article with an attached snap-spring that has been rolled into a stable coiled state.

Figure 6A:
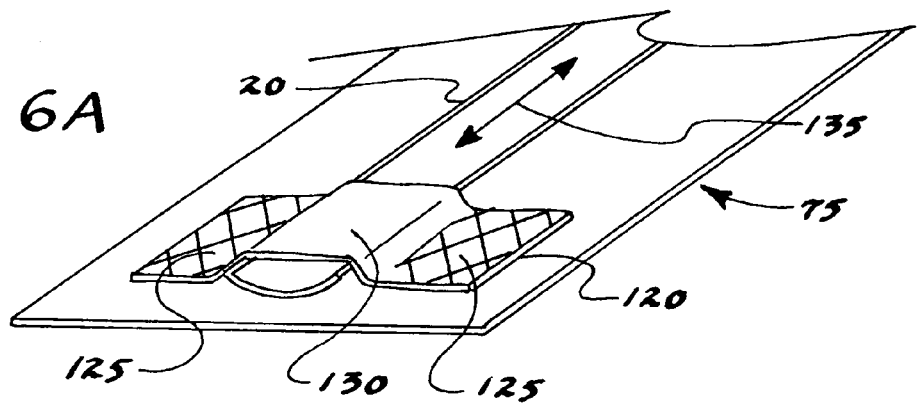

Shown in isometric view FIG. 6A is a flexible article with a bi-stable spring attachment feature that allows relative motion between the spring and the flexible article.

Figure 6B:
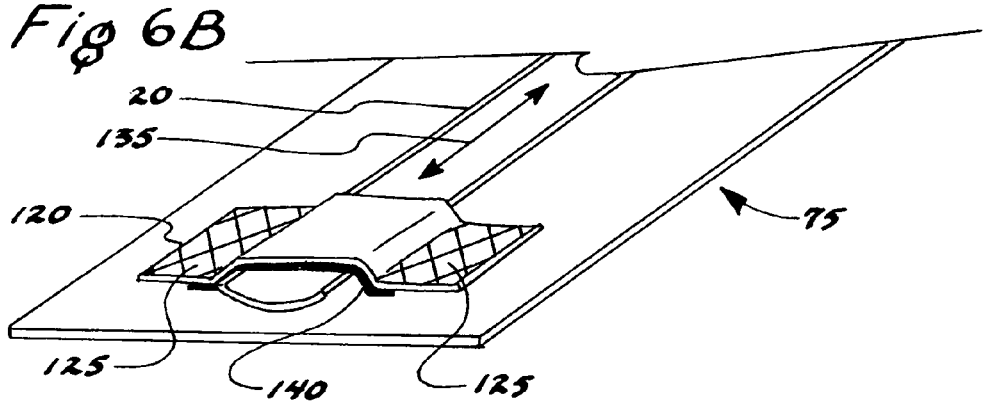

FIG. 6B depicts an isometric view of an alternate configuration of a snap-spring slidably attached to a flexible article.

Figure 6C:
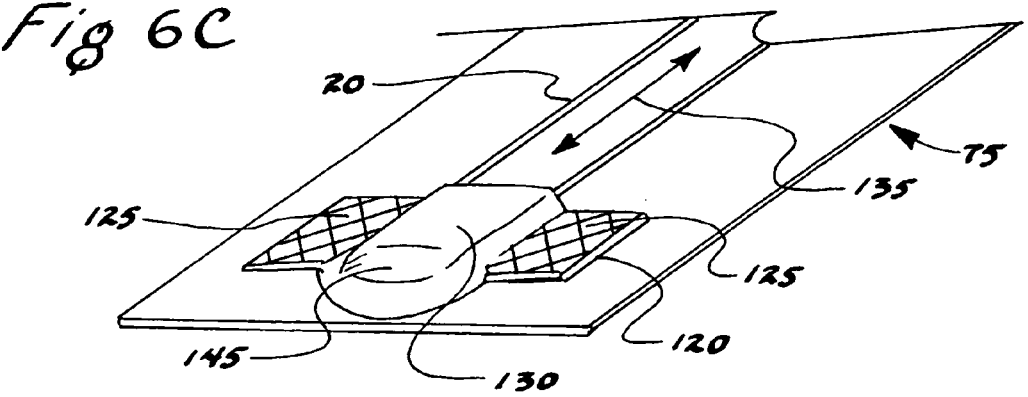

Shown in FIG. 6C is an isometric view of a flexible article with a slidably attached snap-spring feature that incorporates an end pocket or spring containment feature.

Shown in FIG. 7A is an isometric view of a snap-spring being inserted into a formed cavity within an end cap.

Figure 7B:
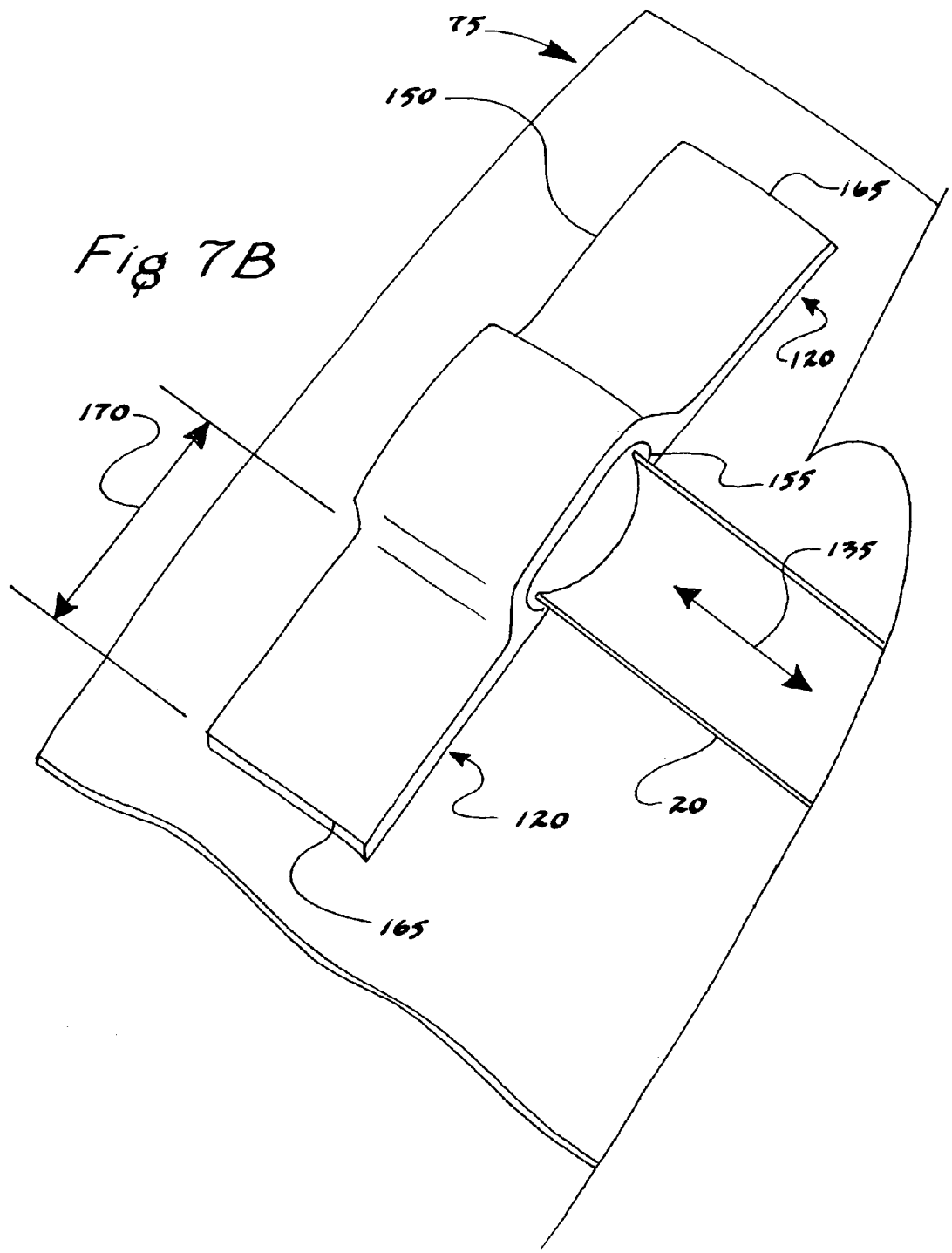

Shown in FIG. 7B is an isometric view of a preferred end cap that incorporates side wings or stiffeners.

Figure 8A:
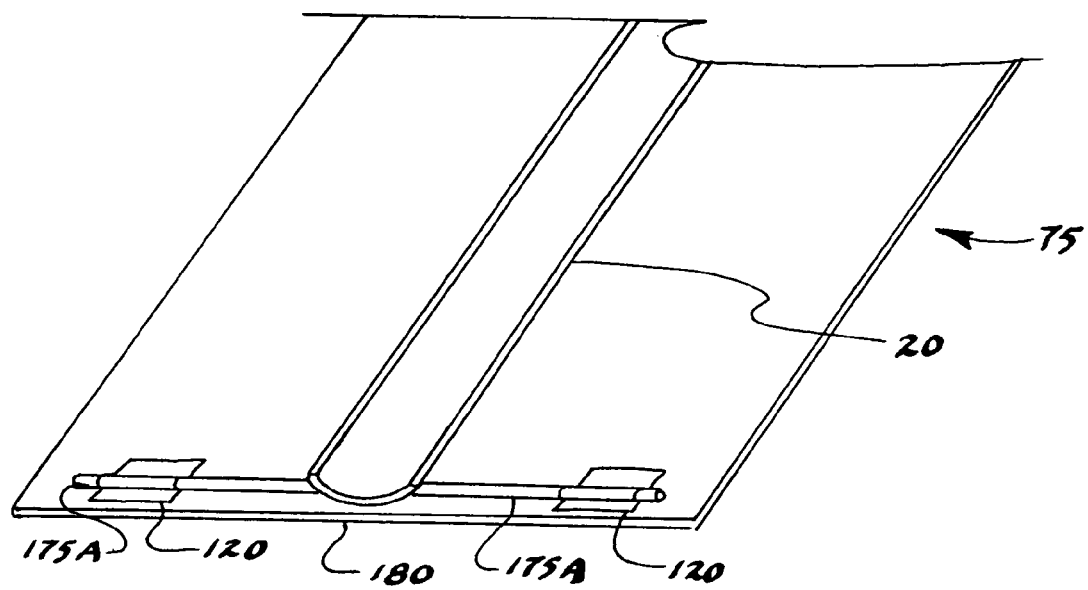

Shown in isometric view FIG. 8A is a flexible article with an attached snap-spring and a stiffening element attached to the flexible article.

Figure 8B:
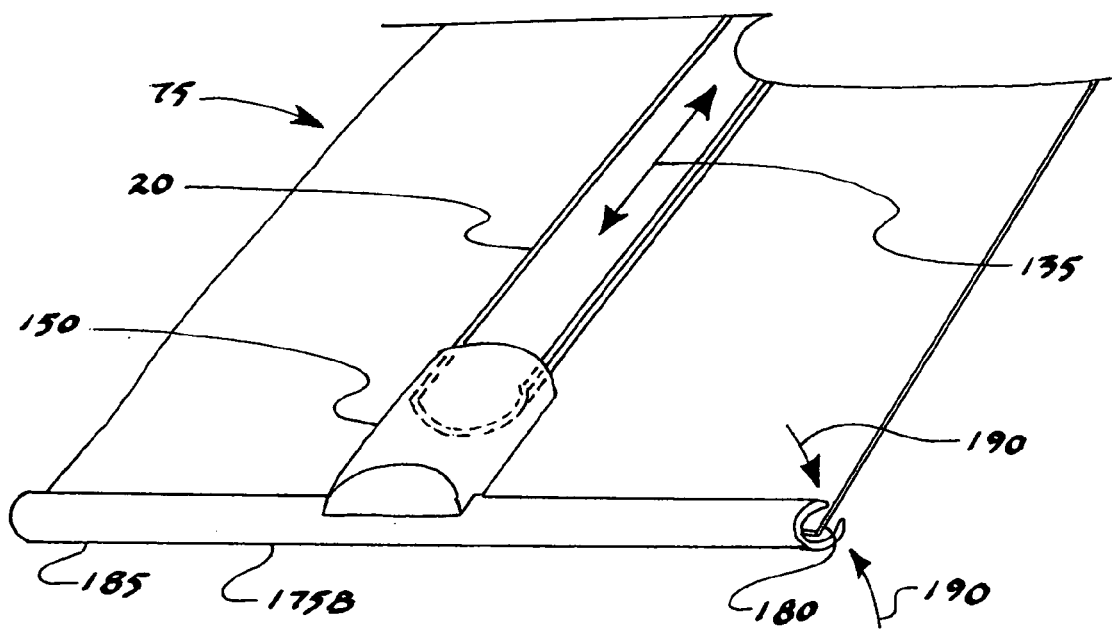

Shown in isometric view FIG. 8B is a preferred embodiment of a combined stiffening and flexible article attachment element.

Shown in isometric view FIG. 9 is a preferred embodiment of a flexible article storage and display device according to the present invention.

Shown in isometric view FIG. 10 is a preferred embodiment of a flexible article storage and display device incorporating a multitude of flexible articles and additional stiffening and flexible article clamping means.

Shown in isometric view FIG. 11 is a hybrid snap-hinge of the present invention having a snap-spring region and two opposing end regions that do not have the properties of a snap-spring.

Shown in isometric view FIG. 12A is a container device incorporating a hybrid spring of the present invention that self latches in a first closed stable state.

Figure 12B:
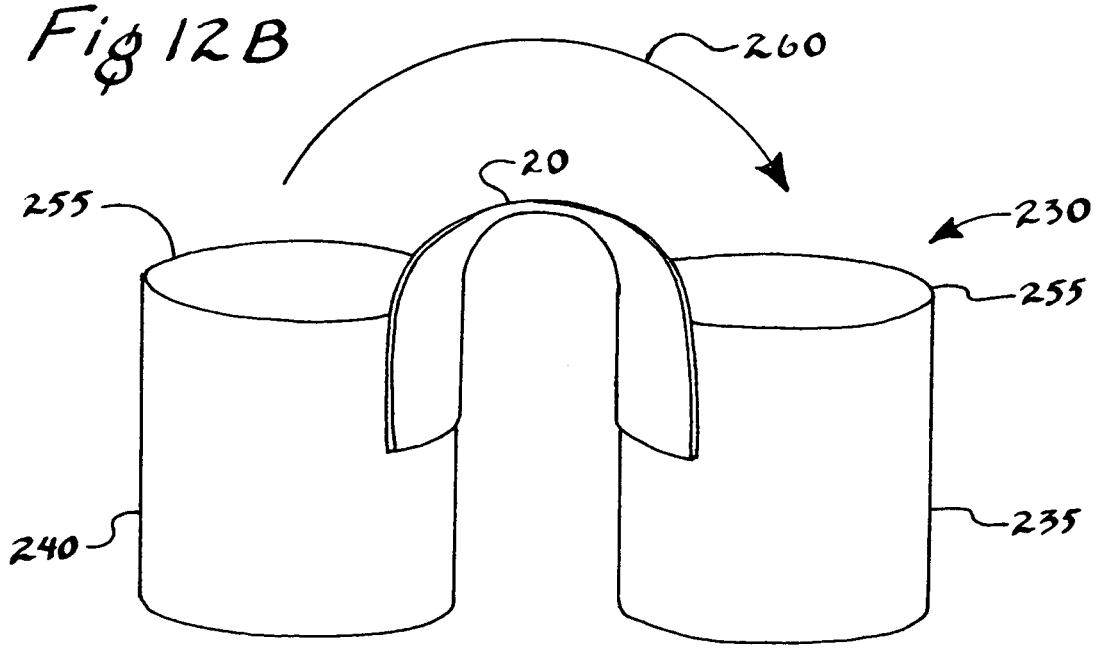

Shown in isometric view FIG. 12B is an is a snap-hinged container of the present invention depicted in a second stable open state.

Figure 12C:
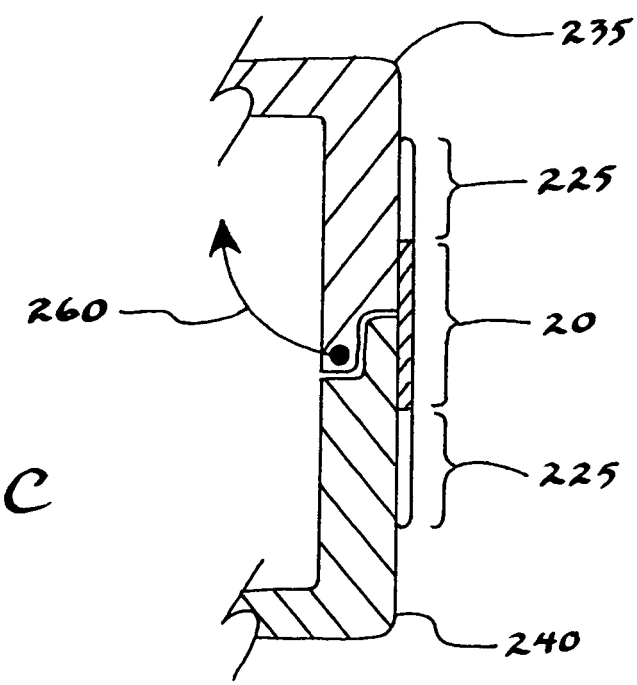

Shown in FIG. 12C is a partial cross-sectional detail of a typical interlocking circumferential seam line of a snap-hinged container.

Figure 13A:
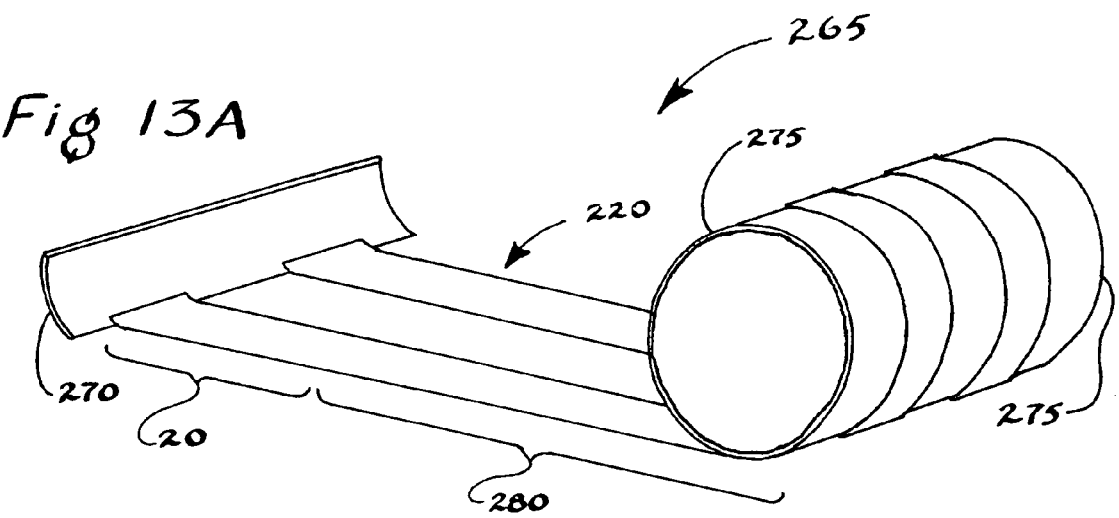

Shown in isometric view FIG. 13A is a can feeder according to the present invention.

Figure 13B:
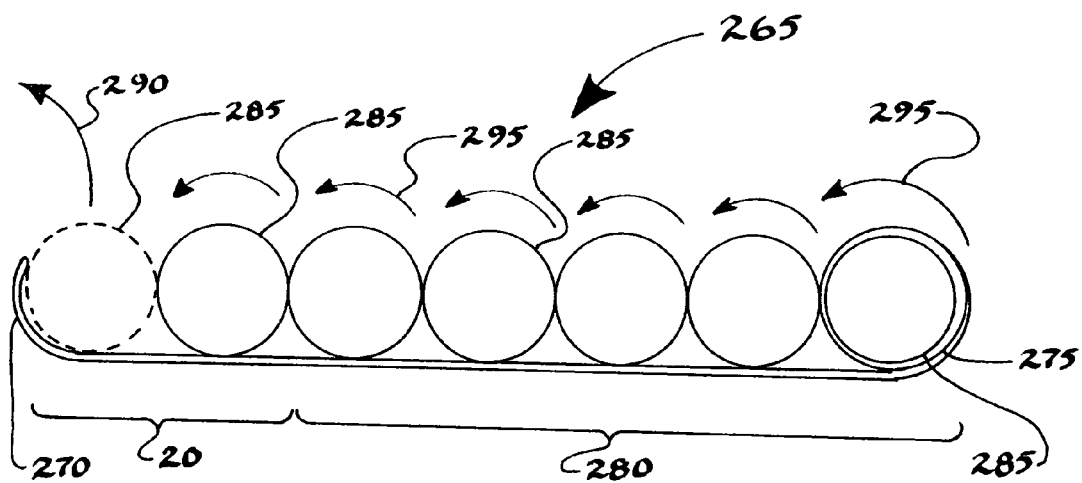

Shown in side view FIG. 13B is a can feeder according to the present invention displaying the removal and indexing of cans.

DETAILED DESCRIPTION OF DRAWINGS

A "snap-spring", as used in various embodiments of the present invention, is comprised of a longitudinal tape material. Preferred tape materials are metals although polymeric materials can be used as well. A tape used according to the present invention is formed to be preferentially coiled along the tape longitudinal axis and has a preferred arcuate cross-section as viewed perpendicular to (or along) the longitudinal tape axis. A proposed explanation of the behavior of a snap-spring or bi-stable ribbon is as follows:

1) When in a stable coiled state the longitudinal stresses of the snap-spring (or ribbon) are generally relieved. The coiling of the ribbon also acts to flatten the arcuate cross-section, which now strains the ribbon in the transverse direction.

2) By applying a longitudinal or tensional force, the ribbon can be progressively uncoiled which now imparts longitudinal strain to the uncoiled portion of the ribbon. Also, as the ribbon is uncoiled, the transverse strain is relieved as the ribbon returns to its arcuate cross-section.

3) As the ribbon is fully uncoiled and extended into a linear shape the formation of the arcuate cross-section progresses along the full length of the ribbon.

4) When the ribbon is fully extended a "snap" occurs as the transverse strain is relieved.

5) In this fully extended, stable linear shape, the arcuate cross-section has a bending moment of inertia that resists the longitudinal coiling stresses developed as a result of the straightening or uncoiling of the ribbon. Thus the ribbon can remain in this linear configuration and resists re-coiling. The ribbon is also characterized as having a degree of column stiffness and therefor has a degree of bending resistance.

6) Affecting a "snap", the linear ribbon is buckled and the arcuate cross-section is flattened in the buckled area, inducing transverse strain. The longitudinal stresses will now induce a recoiling of the ribbon.

7) The recoiling of the ribbon initiates at the point of buckling and progresses down the length of the ribbon as the longitudinal coiling stresses are relieved and the transverse flattening stresses are accumulated.

8) When fully recoiled the ribbon assumes the stable coiled state of step 1) above.

A bi-stable "snap-spring", as used in various embodiments of the present invention, therefor has a first stable "coiled" state and a second stable "linear" state. While in a stable linear state, the application of a "snap" or buckling force will initiate a progressive self-coiling of the ribbon. If the ribbon is essentially unconstrained, the self-coiling will continue until the ribbon is fully coiled upon itself. While in this stable coiled state the application of linear tension will force the coiled ribbon back to a linear shape and by the application of a final "snap" the ribbon will remain in this linear configuration. A bi-stable snap-spring can therefor self-transition from a stable linear state to a stable coiled state upon the application of a "snap" or buckling force to the spring while in a stable linear state.

Figure 1A:
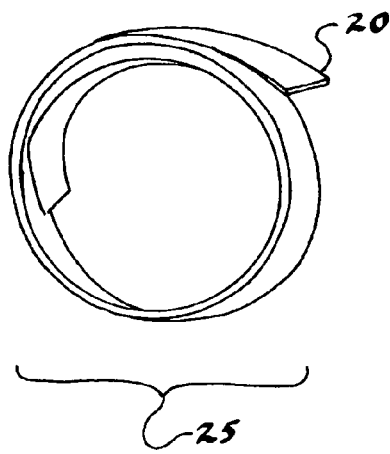
FIG. 1B is isometric view of a bi-stable spring partially uncoiled in a transition state.
FIG. 1C is an isometric view of a bi-stable spring in a stable linear state. Shown is a "snap" applied to the spring, which forces the spring to assume an arcuate cross-section.
Figure 1B:
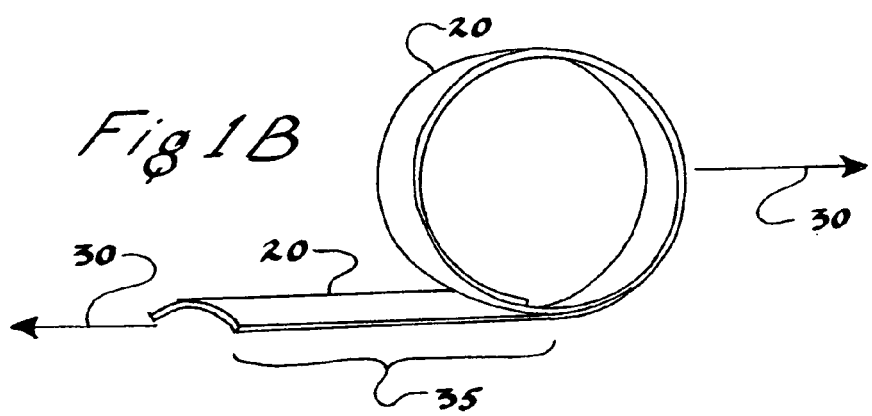
Figure 1C:
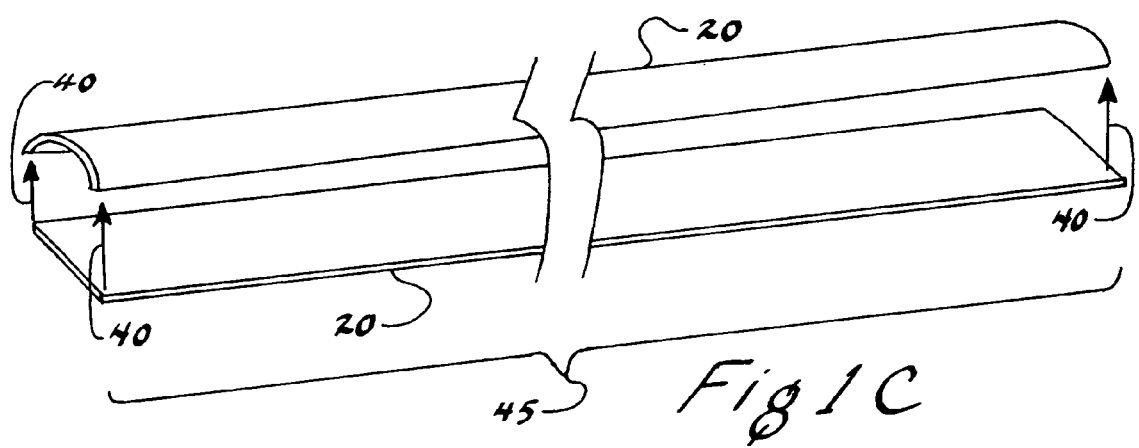

Shown in FIG. 1A is an isometric view of a bi-stable "snap-spring" 20, as used in various embodiments of the present invention. The spring 20 is shown in a stable coiled shape 25. As shown in isometric view FIG. 1B, the spring 20 can be un-coiled by the application of a tensile force 30, which progressively forms a linear portion 35 of the spring 20. When the spring 20 is fully un-coiled, a user induced "snap" 40 stabilizes the spring into a stable linear shape 45 as shown in isometric FIG. 1C.

Figure 2A:
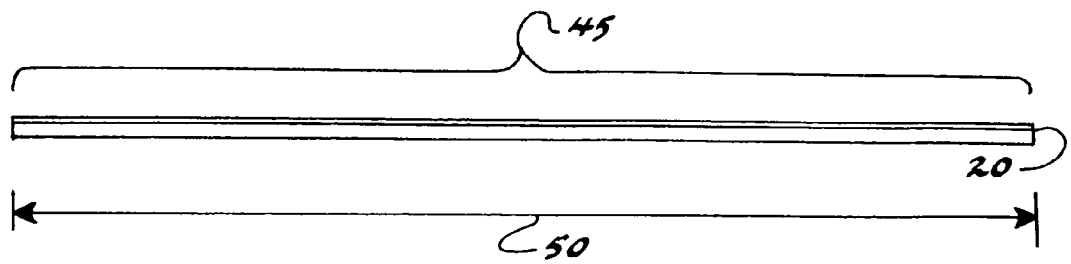
FIGS. 2A and 2B show typical side and cross-sectional end views of a bi-stable "snap-spring" while in stable linear state.
Figure 2B:

FIGS. 2A and 2B show typical side and cross-sectional end views of a bi-stable "snap-spring" used in various embodiments of the present invention. Shown in FIG. 2A is a side plan view of a bi-stable spring 20 in a stable linear state 45 having a spring length 50. Shown in FIG. 2B is an end view of the spring (of FIG. 2A) displaying a spring width 55 while in a stable linear state. Also shown in FIG. 2B is a typical cross-sectional arcuate shape 60 characteristic of a snap-spring while in a stable linear state.

In comparison, FIG. 3A depicts a side plan view of a bi-stable spring 20 while in a stable coiled state 25. Shown in FIG. 3B is an end view of the spring (of FIG. 3A) displaying a spring width 65 while in a stable coiled state. Also shown in FIG. 3B is a typical cross-sectional flat shape 70 characteristic of a snap-spring while in a stable coiled state. The coiled spring width 65 is greater than the linear spring width 55. Thus while in a linear state a snap-spring 20 will assume an arcuate cross-sectional shape 60 and while in a coiled state a snap-spring 20 will assume a flat cross-sectional shape 70.

Shown in FIG. 4A is an isometric view of a generic flexible or rollable article 75. A flexible article can be any article that has a generally planer shape and has adequate flexibility to be rolled by a suitable snap spring without permanent deformation, buckling or fracturing. Such flexible articles include but are not limited to drawings, maps, signs, posters, pouches, bags, cloth sheets, plastic sheets, woven sheets, thin metal foil sheets, composite sheets, curtains, pleated materials, screens, meshes, perforated articles and barriers and may include multiple layers. Shown in FIG. 4A is a flexible article 75 having a length 80 and two opposing perimeter regions 85. The perimeter regions 85 each have a length 90 that is approximately 33% of the flexible article length 80.

Shown in FIG. 4B is an isometric view of a generic flexible or rollable article 75 having a width 95 and two opposing perimeter regions 85. The perimeter regions 85 each have a width 100 that is approximately 33% of the flexible article width 95.

A "perimeter region" is therefor defined as an outer area of a flexible article that encompasses a portion of the articles' outer periphery wherein the perimeter region has a length that is approximately one third of the flexible article's total length and the perimeter region has a width that is approximately one third of the flexible article's total width. For example a flexible article having a general rectangular shape will have four perimeter regions; two regions being opposed on opposite sides having lengths that are approximately one third of the flexible article's total length and two additional regions being opposed on the other opposite sides having widths that are approximately one third of the flexible article's total width.

Shown in FIG. 5A is a preferred embodiment of a flexible article storage and display device according to the present invention. Shown is an isometric view of a flexible article 75 having a width 95 and two opposing perimeter regions 85. A bi-stable "snap-spring" 20 is attached to the flexible article 75 within the two opposing perimeter regions 85. The attachment between the spring and the flexible article is also within the two opposing spring end regions 105. A spring end region is defined as a portion of a spring that encompasses a spring end and has a length equal to about one third of the total spring length. Also shown in FIG. 5A is spring width 55. In a preferred embodiment of the present invention, the flexible article width 95 is at least five times the spring width 55, or in other words the ratio of the flexible article width 95 to the spring width 55 is about 5:1. Ratios of the flexible article width 95 to the spring width 55 can be about 3:1, about 4:1, about 5:1, about 6:1, about 7:1, about 8:1, about 9:1, about 10:1, about 15:1, about 20:1, about 25:1, about 36:1 or higher. The spring 20 shown in FIG. 5A is in a stable linear state 45. One or more snap-springs can be incorporated into a device of the present invention according to the particular characteristics of the flexible article/s.

Shown in FIG. 5B is an isometric view of the article storage device of FIG. 5A in a partially coiled state. Shown is a flexible article 75 with attached snap-spring 20. The spring has a linear portion 35 along a generally planer portion of the flexible article and has a coiled portion 110 about a coiled portion of the flexible article. The flexible article is therefor shown as being rolled in the direction 115.

Shown in FIG. 5C is an isometric view of a flexible article 75 with an attached snap-spring 20 that has been rolled into a stable coiled state 25. The self-transition of the spring 20 from the stable linear state 45 (of FIG. 5A) to the stable coiled state 25 (of FIG. 5C) is preferably initiated by a user induced "snap" or buckling force applied to the spring while in the linear state.

Several methods can be employed to attach or connect a bi-stable snap-spring to a flexible article according to the present invention. The function of various embodiments of the present invention is enhanced by the incorporation of a "slidable attachment" between the snap-spring and the flexible article. This slidable joint allows the snap-spring to slide along its longitudinal axis (relative to the flexible article) as the spring and flexible article are rolled and un-rolled. Shown for example in isometric view FIG. 6A is a flexible article 75 with an attached snap-spring 20. The snap-spring 20 is slidably attached to the flexible article with an adhesive tape 120. The tape is preferably joined to the flexible article in two attachments or adhered areas 125. To permit a relative sliding motion between the spring and the flexible article, the adhesive tape is not adhered to the spring within a "non-adhered" area 130. This form of spring to flexible article constraint allows the spring to translate longitudinally 135 as shown in FIG. 6A.

In an alternate preferred embodiment a slidable attachment between a snap-spring and a flexible article incorporates a lubricious film or tube. Shown for example in FIG. 6B is a snap-spring 20 slidably attached to a flexible article 75. Shown is an adhesive tape 120 having two areas of attachment 125 to the flexible article. Constrained by the taped 120 and surrounding at least the upper surface of the snap-spring is a lubricious film 140. The lubricious film 140 contacts the snap-spring and is attached to or constrained by the adhesive tape 120. The lubricious film 140 can have a planer shape or a generally tubular shape. The lubricious film can also incorporate an adhesive to permit joining to the flexible article. This form of spring to flexible article constraint allows the spring to translate longitudinally 135 as shown in FIG. 6B.

To limit the longitudinal motion of the snap-spring the slidable joint can preferably incorporate a longitudinal stop feature. Shown for example in FIG. 6C is a flexible article 75 with a slidably attached snap-spring 20. Shown is an adhesive tape 120 with areas adhered 125 and non-adhered 130 to the snap-spring 20. The adhesive tape join incorporates a "end pocket" 145 which limits the relative longitudinal motion 135 of the snap-spring 20.

The ends of a snap-spring can be sealed or protected by the use of an end cap. Shown in FIG. 7A is a snap-spring 20 being inserted 160 into a formed cavity 155 within an end cap 150. The end cap can be retained onto a spring end for example by a frictional fit or by the use of an adhesive. Also shown is a hole 152 within the end cap 150 that can be used to hang or gang together one or more flexible article storage and display device according to the present invention. A preferred end cap incorporating side wings is shown in FIG. 7B. Shown is a flexible article 75 with an attached spring end cap 150. The end cap 150 incorporates at least one wing 165. A wing 165 can be joined, for example, to the flexible article under the wing 120 by an adhesive. The end cap incorporates a formed cavity 155 adapted to frictionally attach a snap-spring 20 to the end cap 150 thereby allowing relative sliding motion 135 between the end cap and spring. A wing can have a length 170 that can be adapted to or user trimmed to accommodate the particular size of a flexible article. End caps of the present invention can be made of rigid or flexible materials and can be tailored to flex, allowing a user to induce a "snap" or apply a buckling force to the spring.

An extended wing of an end cap can also serve as a flexible article "stiffening device". Such stiffeners assist in the rolling and unrolling of a flexible article by preventing the edges of a flexible article from buckling or folding. Shown for example in FIG. 8A is a flexible article 75 with an attached snap-spring 20. Near an edge 180 of the flexible article is a stiffening element 175A, attached to the flexible article by adhesive tape 120. Devices of the present invention can incorporate various stiffening elements adapted to a particular shape of a flexible article.

Shown in FIG. 8B is a preferred embodiment of a combined stiffening and flexible article attachment element. Shown is a flexible article 75 with a snap-spring 20 slidably attached to an end cap 150. The slidable attachment allows relative motion 135 between the spring 20 and the end cap 150. Attached to the end cap 150 is a "binder spine" 185 that frictionally engages 190 an edge 180 of the flexible article. The binder spine 185 also serves as a stiffening element 175B and can be tailored to specific dimensions according to a particular flexible element. Multiple flexible articles can also be retained by the binder spine. For example 1, 2, 3, 4, 5, 6, 7, 8, 9, 10 or more flexible articles 75 can be retained and supported by a binder spine 185. In addition, a binder spine or similar clamping device can be used to engage a pouch or pocket that can then be used to contain several loose or odd sized flexible articles. The pouch or pocket is rolled and unrolled (with the contained flexible articles) in a fashion similar to that previously disclosed in FIGS. 5A through 5C. Binder spines or stiffeners can be incorporated into various end caps 150 or be separately affixed to a flexible article. A stiffener can be any element that assists in the rolling and unrolling of a flexible article by preventing the edges of a flexible article from buckling or folding. A stiffener can have, for example, a circular, oval, triangular, square, rectangular, polygon, C-shaped, D-shaped or other suitable cross-sectional profile.

Shown in isometric view FIG. 9 is a preferred embodiment of a flexible article storage and display device according to the present invention. Shown is a snap spring 20 with end caps 150 affixed to the spring opposing ends. Attached to the spring 20 are two stiffening and clamping elements 175C. The stiffening and clamping elements 175C are oriented essentially perpendicular to the spring longitudinal axis. Attached to one of the stiffening and clamping elements 175C are two secondary clamps 195. FIG. 10 depicts the incorporation of a flexible article onto the device of FIG. 9.

Shown in isometric view FIG. 10 is a snap spring 20 with end caps 150 affixed to the spring opposing ends. Attached to the spring 20 are two stiffening and clamping elements 175C. The stiffening and clamping elements 175C are oriented essentially perpendicular to the spring longitudinal axis. Shown is a plurality of flexible articles or sheets 75 with first edges 200 inserted into a first stiffening and clamping element 175C. The clamping element 175C is attached to the flexible articles by a compressive gripping force 190 along the edges of the flexible articles. Also shown are a portion of the flexible article opposing edges 205 inserted into the secondary clamps 195, with the remaining flexible article opposing edges 210 inserted into the second stiffening and clamping element 175C. The configuration shown in FIG. 10 permits a user to stabilize or flatten for display, a series of flexible articles such as a set of drawings. The user can then simply "peel away" a top sheet to expose subsequent sheets that are retained in an essentially flat and planer form by the device of the present invention. A stiffening and clamping element 175C is shown as a profile extruded unitary bi-stable clamp. A user can spread the clamp jaws apart with a finger or other suitable blunt instrument and once spread open, the clamp will remain in the open position permitting insertion of the flexible articles. After the flexible articles are inserted into the clamp, the jaws can be compressed and locked onto the flexible articles by the application of a sliding compression force, similar to the sealing of a "zip-lock" bag.

A specific portion or discreet length of a tape can be formed to have the properties and characteristics of a snap-spring. For example the two end regions of a tape length can be treated to behave as a normally coiled spring while the center region of the tape can be treated to have the properties of a bi-stable snap-spring. Other variations or "hybrids" of normal spring/snap-spring combinations include but are not limited to tape segments with snap-spring properties on the two tape ends, snap-spring properties on one tape end, snap-spring properties in the center region of the tape and multiple regions with snap-spring properties along the length of the tape. The "normal" or non-snap-spring regions of such tape segments can be normally coiled, normally straight, normally bent or normally twisted.

Application of the snap spring properties to a discreet length of a longer ribbon can create a bi-stable hinge mechanism. A convenient storage container of the present invention utilizes the bi-stable characteristics of a snap action ribbon spring to create a container having a self-closing and captured lid. Such containers of the present invention can be used in a variety of environments and for numerous purposes such as the storage of medications, chemicals, liquids and articles.

Shown in isometric view FIG. 11 is a snap-hinge of the present invention having a snap-spring region 20 and two opposing end regions 225 that do not have the properties of a snap-spring. The snap-spring properties can be imparted to the ribbon by a simple drawing process as further described in the attached Examples. Shown in isometric view FIG. 12A is a snap-hinged container 230 of the present invention, incorporating the snap-hinge of FIG. 11. Shown in FIG. 12A is a container 230 having a top portion 235 and a bottom portion 240 positioned together along circumferential seam line 255. Joined to the side of the container portions is a snap-hinge 220 having a snap-spring portion 20 and two opposing "non-snap-spring" portions 225. The snap-hinge 220 can be attached 250 to the container top and bottom portions within the non-snap-spring portions by the use of adhesives, insert molding, frictional fits, welding or any other suitable means of joining. The resultant assembly is a hinged cylinder that self latches in a first closed stable state as shown in FIG. 12A.

The container assembly can be opened by the application of a folding force at the circumferential seam line on the snap-spring portion 20. The application of a folding force causes the snap-hinge to self-transform to a non-linear or arced shape, forcing the two piece cylinder to snap open into a second stable open state. Shown in isometric view FIG. 12B is a snap-hinged container 230 of the present invention depicted in a second stable open state. Upon application of the folding force to the snap-hinge, the top portion 235 of the container "rolls" along an arcuate path 260 as the snap-hinge portion 20 self-transforms to the second stable open state. The container 230 can be re-closed and locked by simply rolling the top portion 235 back onto the bottom portion 240.

As the top and bottom container portions are mated, the snap-hinge portion assumes a linear form that self-locks the container portions together.

Shown in FIG. 12C is a partial cross-sectional detail of a typical interlocking circumferential seam line (255, FIGS. 12A and 12B). Shown is a top container portion 235, a bottom container portion 240, a snap-hinge having a snap-spring portion 20 and two opposing non-snap-spring portions 225. Upon application of a folding force to the snap-spring portion 20, the top portion 235 of the container "rolls" along an arcuate path 260 as the snap-hinge portion 20 self-transforms to the second stable arcuate state.

A simple can or drum feeder of the present invention incorporates a hybrid spring having the bi-stable characteristics of a snap action ribbon spring along with the properties of a normally coiled spring. The hybrid spring of the present invention can be used to form a device that reliably stores and presents cans such as soda cans.

Shown in isometric view FIG. 13A is a can feeder according to the present invention. Shown is a ¼-circle stop element 270 attached to the first ends of two hybrid ribbon springs 220. The opposing second ends of the hybrid spring are coiled or wrapped around a roll tube 275. The hybrid ribbon spring has a first snap-spring portion 20 and a second normally coiled non-snap-spring portion 280. The snap-spring portion 20 is biased to a stable linear state while the normally coiled portion is biased to self-roll towards the stop 270. The roll tube is therefor rolled towards the stop 270 due to the influence of the self-rolling spring.

Shown in side view FIG. 13B is a can feeder according to the present invention. Shown is a stop or can presentation element 270 attached to hybrid ribbon springs having snap-spring portions 20 and a normally coiled portions 280. A multitude of cans 285 are shown positioned onto the device 265. An optional can be contained within the roll tube 275. When a first can is removed 290 from the stop 270, the remaining cans 285 are forced towards the stop 270 due to the influence of the normally coiled spring portion 280. As the springs recoil, the cans are rolled 295 forward towards the stop, conveniently presenting the next can. When the first can is removed 290, the snap-spring portions 20 (in the stable linear state) prevent the springs from lifting up and coiling the stop portion 270 towards the roll tube 275. The spring portions near the stop remain in a flat linear state after the first can is removed while the remainder of the hybrid spring is free to self-roll. Thus after a first can is removed, a first portion of the hybrid spring presents a flat linear area for subsequent cans to roll onto while the second portion of the hybrid spring is allowed to recoil and force the remaining cans towards the presentation stop.

Can feeders of the present invention can be incorporated into existing can packaging or be incorporated into a stand-alone device. Feeding devices of the present invention can also be sized to accommodate various can dimensions including drums or any other suitable rollable article.

EXAMPLE 1

A flexible article or plan holder of the present invention was constructed using the following materials and processes:

1) A snap-spring component was fashioned from a 36 inch length of a one inch wide tape measure tape (Lufkin® L525). The normally straight tape was converted into a coiled bi-stable snap spring by drawing it over a 0.19" diameter dowel pin with the crown of the tape width being in contact with the pin. Each end of the tape was manually tensioned with the aid of pliers to about 30 lbs. during the drawing of the tape over the pin. The ends affected by the clamping were cut with heavy scissors, leaving about 29" of converted tape. Approximately one inch of each end was dip coated with textured rubber coating (Rust-Oleum® Corp.) to seal any potential sharp edges.

2) Two sliding crossbar stiffeners were assembled. A polycarbonate sheet material about 0.02" thick was cut to an approximate 2.0" by 0.5" rectangle. A ½" square of double-sided foam tape (Scotch® Brand) was placed at each end of the 2" long polycarbonate strip and the assembly was then attached to an 11" long report binder clip (Office Depot®) at the approximate center of its length, forming a crossbar stiffener. Due to the thickness of the foam tape, a "sliding channel" was formed between the polycarbonate rectangle and the report binder clip. The channel was approximately 1" wide by 0.08" high allowing the snap-spring to slide within the channel.

3) A stiffener was then attached to each 22" edge of a 27" by 22" topographical map with an adhesive tape. The stiffener was oriented with the polycarbonate rectangle on the backside of the map. The snap-spring from 1) above was then straightened and threaded through the sliding channels of each stiffener.

4) The resultant device supported the map in a stable flat planer viewing form as generally depicted in FIG. 5A. Upon bending one end of the snap-spring, the map, stiffeners and spring self-recoiled into a stable rolled form for stowage as generally shown in FIG. 5C.

EXAMPLE 2

A snap hinge of the present invention was constructed using the following materials and processes:

1) A hinge component was fashioned from a 12 inch length of a one inch wide tape measure tape (Lufkin® L525). At the approximate mid point along the length of the tape of the tape, a discrete length of about 1" was drawn over a 0.19" diameter dowel pin with the crown of the tape width being in contact with the pin. Each end of the tape was manually tensioned with the aid of pliers to about 30 lbs. during the drawing of the tape over the pin. The ends affected by the clamping were cut with heavy scissors, leaving about a 6" total length with an integral hinging length of about 1". The tape acted as a snap-spring only along the converted 1" length and therefor formed a bi-stable hinging tape.

2) Each end of the bi-stable hinging tape was then attached to a 3.75" length of 1.75" inner diameter plastic tubing with capped ends (DAP® caulking tubes). The spring ends were attached to the plastic tubes using 2" of ½" wide double-sided foam tape (Scotch® Brand) such that the 1" hinging length of the tape was free from attachment.

3) The resultant device of the present invention was an elongate cylinder, circumferentially split about its length forming two cylinder halves each about 3.75" long. The two cylinder halves were joined together by the hinge spring. The resultant assembly created a hinged cylinder that self latched in the closed position. Application of a folding force at the circumferential split caused the two piece cylinder to snap open to a stable open state. The resultant device is generally depicted in FIGS. 12A and 12B. In a modified example, a 0.75" wide slot was cut partially down the length of one of the two cylindrical halves to facilitate the removal of golf balls and tees.

EXAMPLE 3

A can dispenser of the present invention was constructed using the following materials and processes:

1) Two identical snap-spring components were fashioned from a 36 inch lengths of one inch wide tape measure tape (Lufkin® L525). The normally straight tape was converted into a coiled spring over about 30" of its length by drawing it over a small 0.125" diameter dowel pin with the crown of the tape width being in contact with the pin. The remaining 6" of tape was converted into a snap-spring by drawing it over a larger 0.19" diameter dowel pin with the crown of the tape width being in contact with the pin. Each end of the tape was manually tensioned with the aid of pliers to about 30 lbs. during the drawing of the tape. The ends affected by the clamping were cut with heavy scissors, leaving about 5" of snap-spring length and about 21" of coiled spring length in each of the about 26" long tape segments.

2) Acrylic tubing with an inside diameter slightly larger than the outside diameter of a 12 oz soda can was used for the opposing ends of the can dispenser device. A tube of 2.56" inner diameter was prepared as the "rolling" end and a 90° (or ¼ circle) of the same tubing was used for the "stop" end. Both of the "roll" and "stop" ends were cut to a 3.5" length.

3) The two snap-spring components were then attached to the "stop" end by nesting the ends formed to be snap-springs inside of the curvature of the ¼ circle using double-sided tape (Scotch® Brand). The "coil ends" of the springs were attached to the "roll" end using double-sided tape (Scotch® Brand) so that the coil forces of the spring acted to pull the roll towards the stop. The two springs were aligned with an approximate 1" space between the springs at both ends and along the spring length.

4) The resultant device of the present invention progressively self-advanced soda cans forward towards the stop upon the removal of a can. The snap-spring effect near the stop prevented the spring from retracting back around the remaining cans until the last can was advanced. The final can was removed from the dispensing device by pushing it through the "roll" end. The resulting device is generally shown in FIGS. 13A and 13B.

Although the invention has been described in conjunction with specific embodiments, it is evident that many alterations and variations will be apparent to those skilled in the art in light of the foregoing descriptions and annexed drawings. Accordingly, the invention is intended to embrace all of the alternatives and variations that fall within the spirit and scope of the appended claims.

I claim:

1. A storage device, comprising:
   At least one bi-stable ribbon-like spring having a length and width;
   the spring having first and second opposing end regions;
   the spring having a longitudinal axis;
   the spring having a first stable linear state and a second stable coiled state;
   the spring able to self-transition from the first linear state to the second coiled state;
   at least one stiffening element adapted to be slidably attached to an end region of the spring allowing relative sliding motion between the spring and the stiffening element as the spring transitions between the first linear state and the second coiled state;
   the stiffening element being oriented essentially perpendicular to the spring longitudinal axis; and
   the stiffening element adapted to attach to a flexible article within an opposing region of the flexible article.

2. The storage device of claim 1 wherein the flexible article is a drawing.

3. The storage device of claim 1 wherein the flexible article is a map.

4. The storage device of claim 1 wherein the flexible article is a display.

5. The storage device of claim 1 wherein the flexible article is a pouch.

6. The storage device of claim 1 wherein the flexible article is composed of multiple layers.

7. The storage device of claim 1 wherein the flexible article is a surface covering.

8. The storage device of claim 1 wherein the flexible article is an opening cover.

9. The storage device of claim 1 wherein the spring self-transition from the first stable linear state to the second stable coiled state is initiated by a user induced snap.

10. The storage device of claim 1 wherein the spring is forced to form the first stable linear state by the application of adequate tension to the spring while in the second coiled state.

11. The storage device of claim 1 wherein at least one opposed region of the flexible article has a label.

12. The storage device of claim 1 further comprising at least one spring end cap adapted to attach to an end region of the spring.

13. A storage device kit, comprising:
   a kit container;
   at least one bi-stable ribbon-like spring having a length and width;
   the spring having first and second opposing end regions;
   the spring having a first stable linear state and a second stable coiled state;
   the spring able to self-transition from the first linear state to the second coiled state;
   at least one stiffening element tailored to allow attachment to a flexible article; and
   the stiffening element adapted to slidably attach to at least one spring end region allowing relative sliding motion between the stiffening element and the spring end region as the spring transitions between the first linear state and the second coiled state.

14. The kit of claim 13 wherein the stiffening element incorporates an adhesive.

15. The kit of claim 13 wherein the stiffening element incorporates a frictional grip.

16. The kit of claim 13 wherein the stiffening element incorporates a clamp.

17. The kit of claim 13 wherein the stiffening element incorporates a magnet.

18. The kit of claim 13 wherein the spring length can be user tailored to adapt to a particular flexible article.

19. The kit of claim 13 further comprising at least one label.

20. The storage device kit of claim 13 further comprising at least one spring end cap adapted to attach to an end region of the spring.

21. A storage device, comprising:
   at least one bi-stable ribbon-like spring having a length, a width, first and second opposing end regions and a longitudinal axis;

the spring having a first stable linear state and a second stable coiled state;

the spring able to self-transition from the first linear state to the second coiled state;

at least one stiffening element adapted to be slidably attached to at least one spring end region allowing relative sliding motion between the stiffening element and the spring end region as the spring transitions between the first linear state and the second coiled state;

the connected stiffening element being oriented essentially perpendicular to the spring longitudinal axis;

the at least one stiffening element tailored to be connected to a flexible article having a length and a width; and the flexible article width being at least seven times the spring width.

22. The storage device of claim 21 further comprising at least one spring end cap adapted to slidably constrain an end region of the spring.

23. The storage device of claim 22 wherein the spring end cap is configured to connect to the stiffening element.

24. The storage device of claim 22 wherein the spring end cap is integral to the stiffening element.

25. The storage device of claim 21 further comprising at least one spring end cap adapted to attach to an end region of the spring.

26. A storage device, comprising:

at least one bi-stable ribbon-like spring having a length and width;

the spring having first and second opposing end regions;

the spring having a first stable linear state and a second stable coiled state;

the spring able to self-transition from the first linear state to the second coiled state;

one spring end region being slidably attached to a stiffening element allowing relative sliding motion between the spring end region and the stiffening element as the spring transitions between the first linear state and the second coiled state; and the stiffening element tailored to allow attachment to an opposed region of a flexible article.

27. The storage device of claim 26 further comprising at least one spring end cap adapted to attach to an end region of the spring.

* * * * *